United States Patent
Peluffo et al.

(10) Patent No.: US 7,628,644 B1
(45) Date of Patent: Dec. 8, 2009

(54) ANGLED PATCH PANEL WITH REMOVABLE FORWARDLY-EXTENDING DISPLAY

(75) Inventors: Matias Peluffo, Guadalajara (ES); Xinghua Wang, Changsu of Suzhou (CN)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 12/361,766

(22) Filed: Jan. 29, 2009

(51) Int. Cl.
*H01R 13/60* (2006.01)

(52) U.S. Cl. .................................. 439/540.1

(58) Field of Classification Search .............. 439/540.1, 439/541.5, 532, 534, 557; 361/827, 829; 385/53, 135
See application file for complete search history.

(56) References Cited

U.S. PATENT DOCUMENTS

| | | | |
|---|---|---|---|
| 7,094,095 B1 | 8/2006 | Caveney | |
| 7,207,835 B2 * | 4/2007 | Levesque et al. | 439/540.1 |
| 7,220,145 B2 * | 5/2007 | Denovich et al. | 439/540.1 |
| D544,598 S | 11/2007 | Laursen et al. | |
| 7,300,308 B2 | 11/2007 | Laursen et al. | |
| 7,393,243 B2 * | 7/2008 | Caveney | 439/540.1 |
| 7,488,205 B2 | 2/2009 | Spisany et al. | |

* cited by examiner

*Primary Examiner*—Chandrika Prasad
(74) *Attorney, Agent, or Firm*—Myers Bigel Sibley & Sajovec

(57) ABSTRACT

A patch panel assembly includes: a patch panel having a pair of arms fixed relative to each other, the arms forming an obtuse angle, each of the arms including a plurality of mounting locations for telecommunications connectors, with a vertex of the obtuse angle extending in a forward direction, the patch panel further comprising a plurality of telecommunication connectors mounted in the mounting locations; and a display module removably mounted to the patch panel, the display module having a body and a front-facing display surface, the display surface being positioned forwardly of the vertex of the obtuse angle. In this configuration, the removable display module can provide additional display area for annotations regarding the connectivity of the patch panel, and can do so with the attendant advantages of a removable display.

14 Claims, 6 Drawing Sheets

ANGLED PATCH PANEL WITH REMOVABLE FORWARDLY-EXTENDING DISPLAY

FIELD OF THE INVENTION

The present invention is directed generally to communication connectors, and more specifically to connectors employed with patch panels.

BACKGROUND OF THE INVENTION

Communications cables, such as shielded and unshielded twisted pair cables, coaxial cables, and fiber optic cables, transmit data, voice, video and/or audio information in the telecommunications industry. Network equipment enclosure rack systems are well-known in this industry for managing and organizing such cables as they are routed to and from various destinations.

Rack systems typically include a distribution frame rack on which one or more patch panels, network equipment, fiber optic enclosures and the like are mounted. Rack systems serve various functions, including their use as slack trays, splice trays, cable organizers and patch panels. These rack systems also serve as interconnect or cross-connect enclosures when they interface with equipment. Additionally, rack systems may serve as a telecommunications closet, allowing the cables to be terminated, spliced, patched and/or stored at various places along their length.

The rack is usually formed from a frame having mounting apertures located along the vertical legs or walls of the rack. Patching equipment, such as a patch panel, is mounted onto the rack so as to generally define a patching side, where patch cords from another active device or another patch panel can be cross-connected and interconnected, and a distribution side, where cables from network equipment and/or work station areas are terminated.

Generally, some structures or feature for cable management are provided on both sides of the rack to support and route the cables. With the increasing use of fiber optic connectors as applied to connector rack systems, proper cable management and bend radius control has become increasingly important. Many known systems are unable to provide complete bend radius control, are inefficient, are difficult to manufacture, are difficult to manage and access, and/or have other drawbacks.

One proposed improvement to patch panel design is described in U.S. Pat. No. 6,866,541 to Barker et al. This patent describes a patch panel that defines generally a shallow V-shape (rather than being flat or planar), such that the vertex of the "V" protrudes in front of the rack to which it is mounted. Jacks mounted in the patch panel are mounted flush with the patch panel surfaces so that they are oriented to face outwardly as well as forwardly. Consequently, both plug insertion and cord management may be simplified.

Typically, an angled patch panel includes a small, flat surface at the "vertex" of the arms of the panel that provides a display for the patch panel; for example, notations about the connectivity of the jacks in the patch panel may be displayed. However, this space is typically relatively small, and may not provide sufficient "real estate" for complete or meaningful notations. As such, it may be desirable to provide a patch panel that addresses this issue.

SUMMARY

As a first aspect, embodiments of the present invention are directed to a patch panel assembly. The patch panel assembly comprises: a patch panel having a pair of arms fixed relative to each other, the arms defining an obtuse angle, each of the arms including a plurality of mounting locations for telecommunications connectors, with a vertex of the obtuse angle extending in a forward direction, the patch panel further comprising a plurality of telecommunication connectors mounted in the mounting locations; and a display module removably mounted to the patch panel, the display module having a body and a front-facing display surface, the display surface being positioned forwardly of the vertex of the obtuse angle. In this configuration, the removable display module can provide additional display area for annotations regarding the connectivity of the patch panel, and can do so with the attendant advantages of a removable display.

As a second aspect, embodiments of the present invention are directed to a patch panel assembly, comprising: a patch panel having a pair of arms fixed relative to each other via a front face, the arms defining an obtuse angle, each of the arms including a plurality of mounting locations for telecommunications connectors, with a vertex of the obtuse angle extending in a forward direction, the patch panel further comprising a plurality of telecommunication connectors mounted in the mounting locations; and a display module removably mounted to the front face of the patch panel, the display module having a body and a front-facing display surface, the display surface being positioned forwardly of the front face of the patch panel.

DETAILED DESCRIPTION

Figure 1:
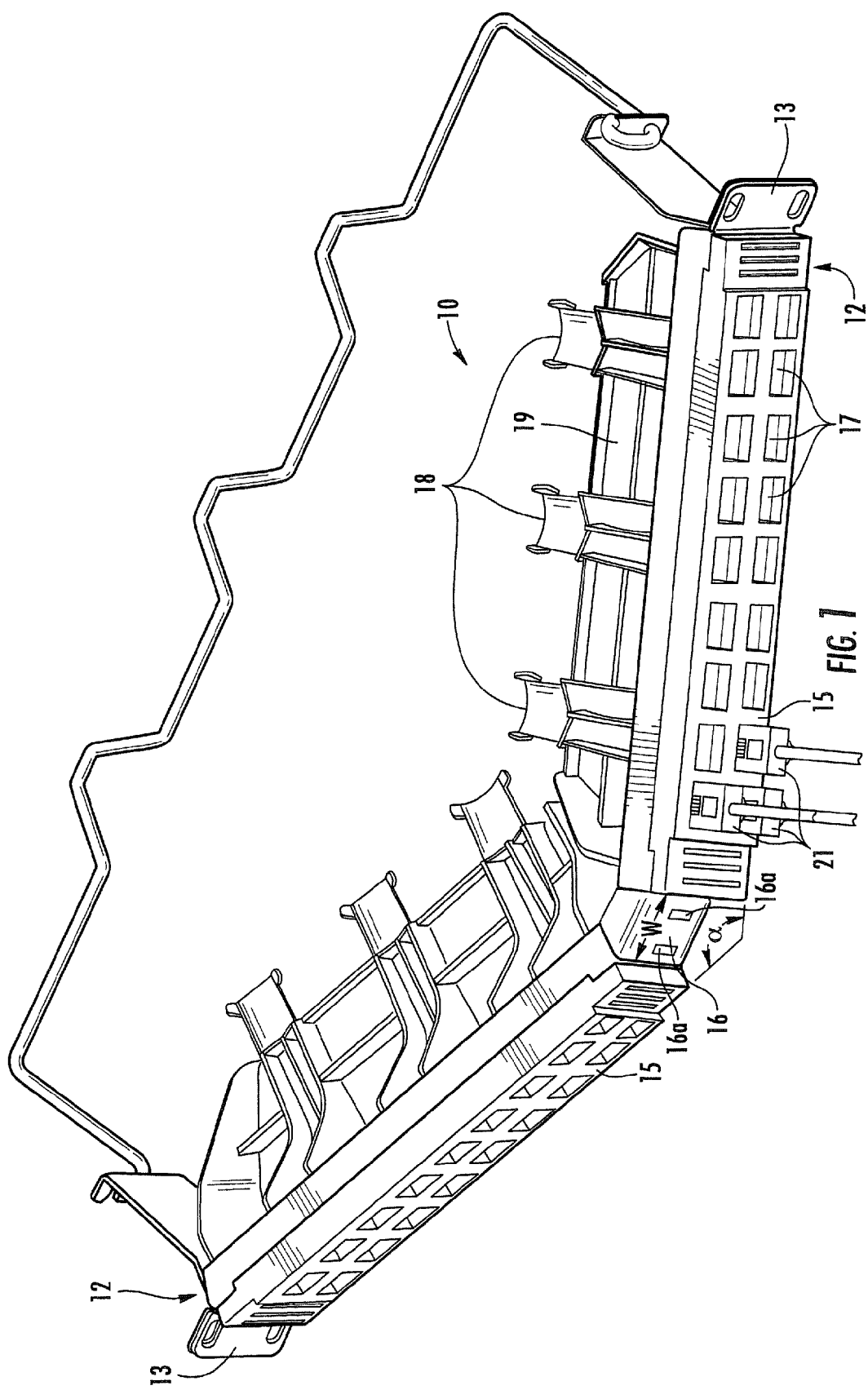
FIG. 1 is a perspective view of a telecommunications patch panel according to embodiments of the present invention, with the display module removed.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein the expression "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Where used, the terms "attached", "connected", "interconnected", "contacting", "mounted," "coupled" and the like can mean either direct or indirect attachment or contact between elements, unless stated otherwise. In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Well-known functions or constructions may not be described in detail for brevity and/or clarity.

This invention is directed to a patch panel for communications connectors, with a primary example of such being a communications outlet or jack. As used herein, the terms "forward", "forwardly", and "front" and derivatives thereof refer to the direction defined by a vector extending from the center of the patch panel toward the bottom of the page in FIG. 3. Conversely, the terms "rearward", "rearwardly", and derivatives thereof refer to the direction directly opposite the forward direction; the rearward direction is defined by a vector that extends from the center of the patch panel toward the top of the page in FIG. 3. The terms "lateral," "laterally", and derivatives thereof refer to the direction defined by a vector originating at the center of the patch panel and extending normal to a vertical plane that extends through the center of the patch panel toward the viewer in FIG. 3. The terms "medial," "inward," "inboard," and derivatives thereof refer to the direction that is the converse of the lateral direction, i.e., the direction extending from the periphery of the patch panel toward the aforementioned bisecting plane.

Turning now to the figures, a patch panel, designated broadly at 10, is shown in FIG. 1. As with conventional angled patch panels, the patch panel 10 includes a pair of generally horizontally-disposed arms 12 fixed relative to each other that are oriented to one another at an angle α. Typically, the angle α is between about 100 and 150 degrees. A flange 13 for mounting the patch panel 10 to a communications rack or the like is attached at the free end of each arm 12. The front surface of each arm 12 is covered by a bezel 15 that includes apertures 17 that serve as mounting locations for telecommunications connectors. Cable organizing chutes 18, joined by a scaffold 19, extend from the rear of each arm 12.

Referring again to FIG. 1, a plurality of connectors 21 is mounted to each of the arms 12 in the apertures 17. As used herein the term "connector" is intended to encompass telecommunications connectors and devices employed to facilitate the interconnection of telecommunications cords and cables for the transmission of signals therebetween. A connector may include a termination device at the end of a cord or cable, an adapter that facilitates the interconnection of two termination devices (as may be employed in the interconnection of fiber optic cords and cables, such as may be found in a connector block), a jack, plug, or the like typically employed with copper cables and cords, or other devices that provide a location for the interconnection of cables and cords. In the illustrated embodiment, the connectors 21 are telecommunications jacks. Each of the connectors 21 is mounted on the arms 12 such that its receiving aperture (i.e., for receiving a mating communications plug or the like) is aligned with a respective aperture 17 in the bezel 15, thereby enabling a mating component to be inserted into the connector 21 through the bezel 15. It will be appreciated by those of skill in this art that in some embodiments the bezel 15 may be omitted and the apertures 17 may be formed directly a frame piece that comprises the arm 12.

As can be seen in FIG. 1, a front face 16 of the patch panel 10 is disposed between the arms 12 at the "vertex" of the patch panel 10. In conventional patch panels, the front face 16 provides space for annotation regarding the connectivity of the patch panel 10. For example, as shown in FIG. 1, the front face 16 has a width w for the display of annotation. Typically, the width w is between about 0.5 and 2.0 inches. Also, because patch cords connected to the connectors 21 tend to extend away from the center of the patch panel 10, a "cone" of empty space is formed in front of the patch panel 10.

Figure 2:
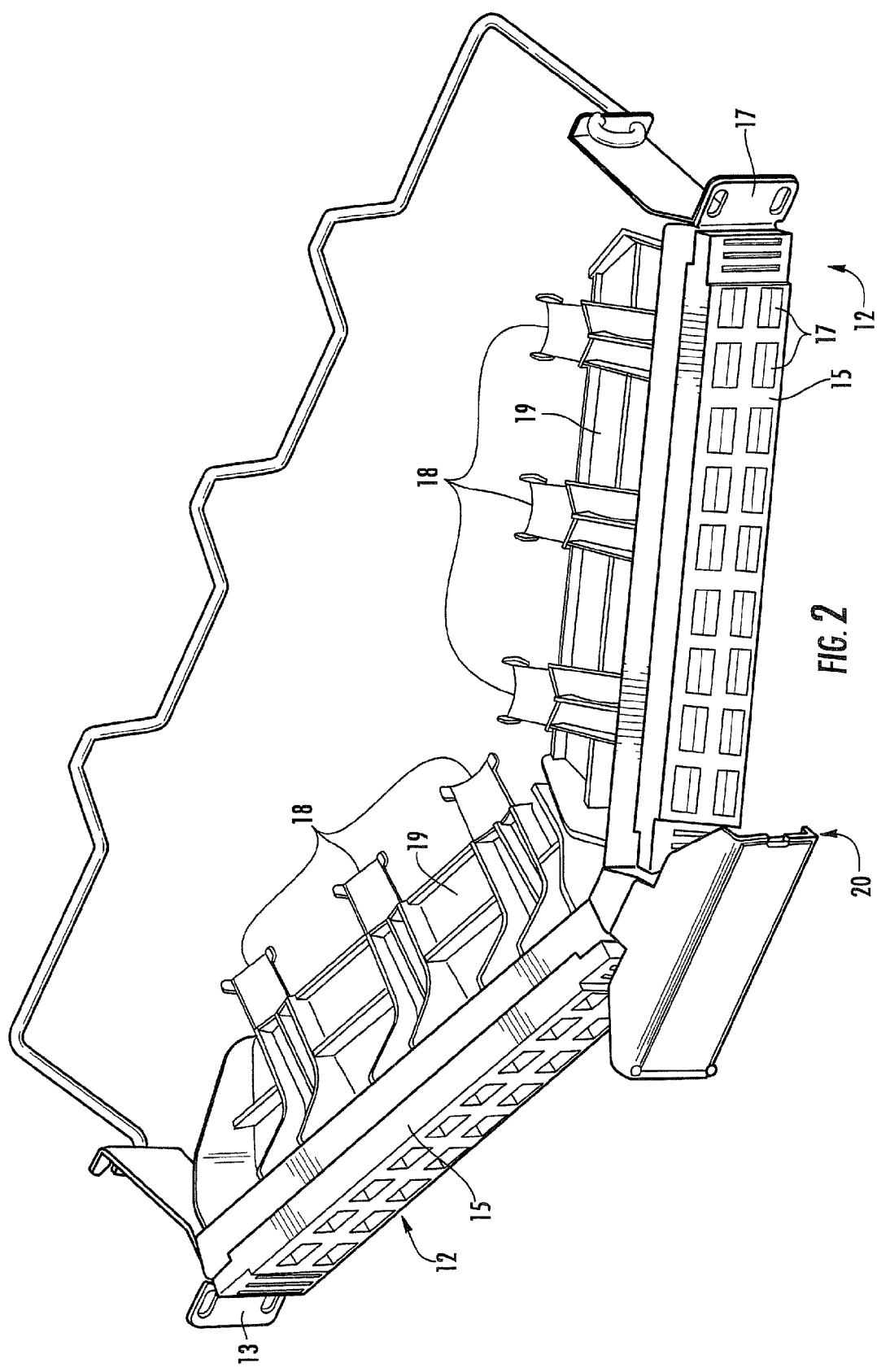
FIG. 2 is a perspective view of the patch panel of FIG. 1 with the display module attached.
Figure 3:
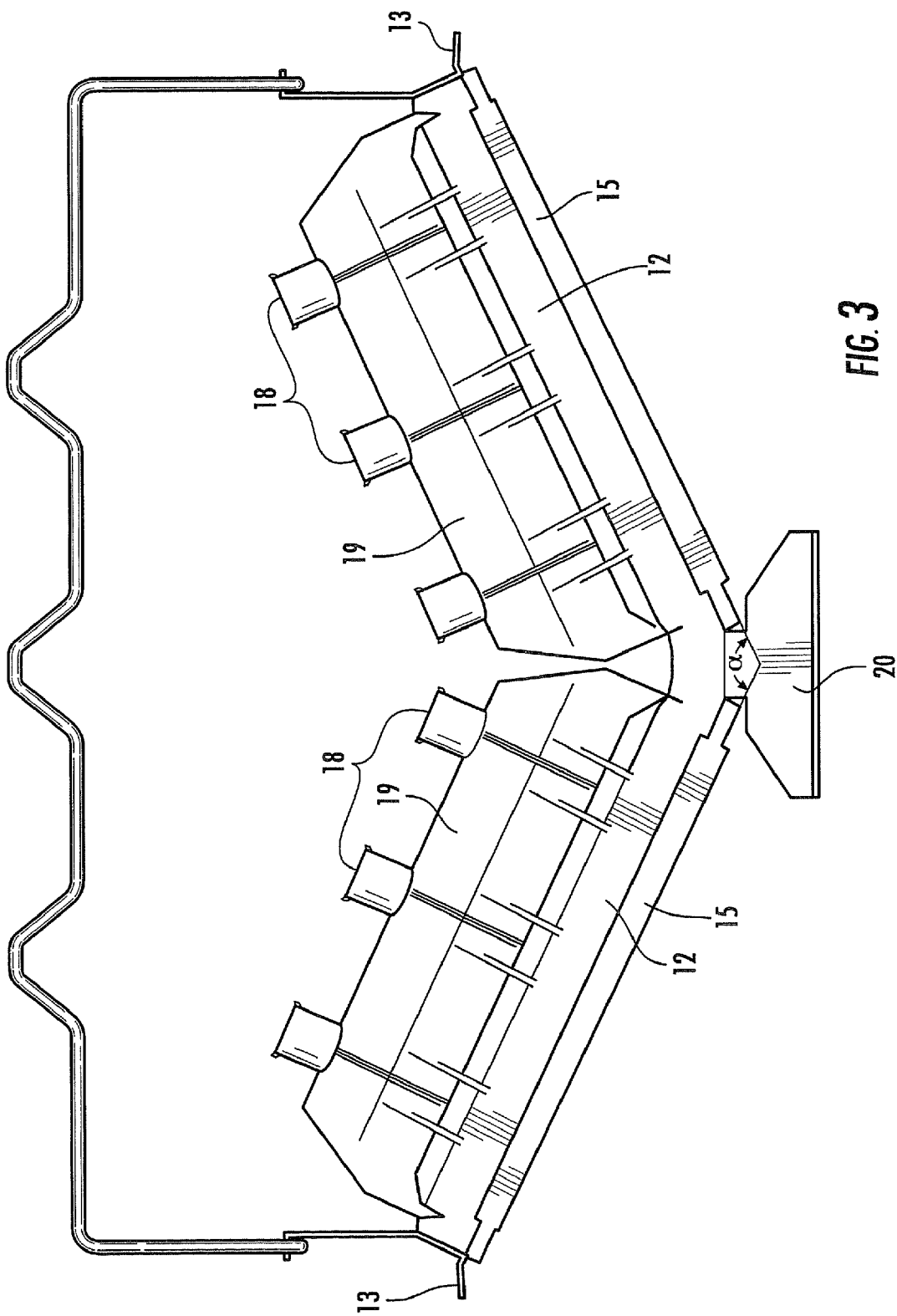
FIG. 3 is a top view of the patch panel and display module of FIG. 3.

As seen in FIGS. 2 and 3, embodiments according to the present invention may further include a label display module 20 that is mounted over the front face 16 of the patch panel 10. The module 20 is described in greater detail below.

Figure 4:
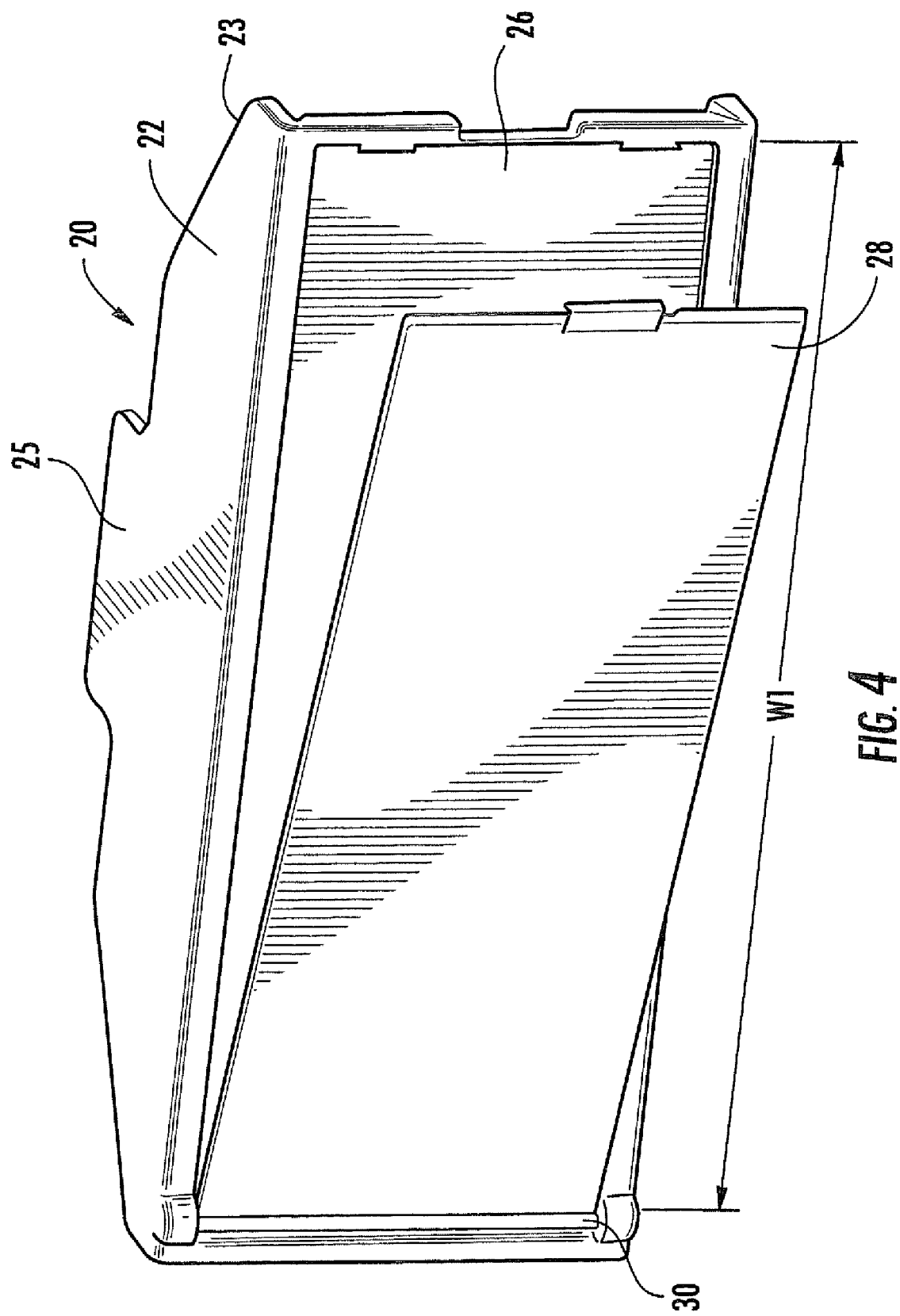
FIG. 4 is a front perspective view of the display module of FIG. 2.
Figure 5:
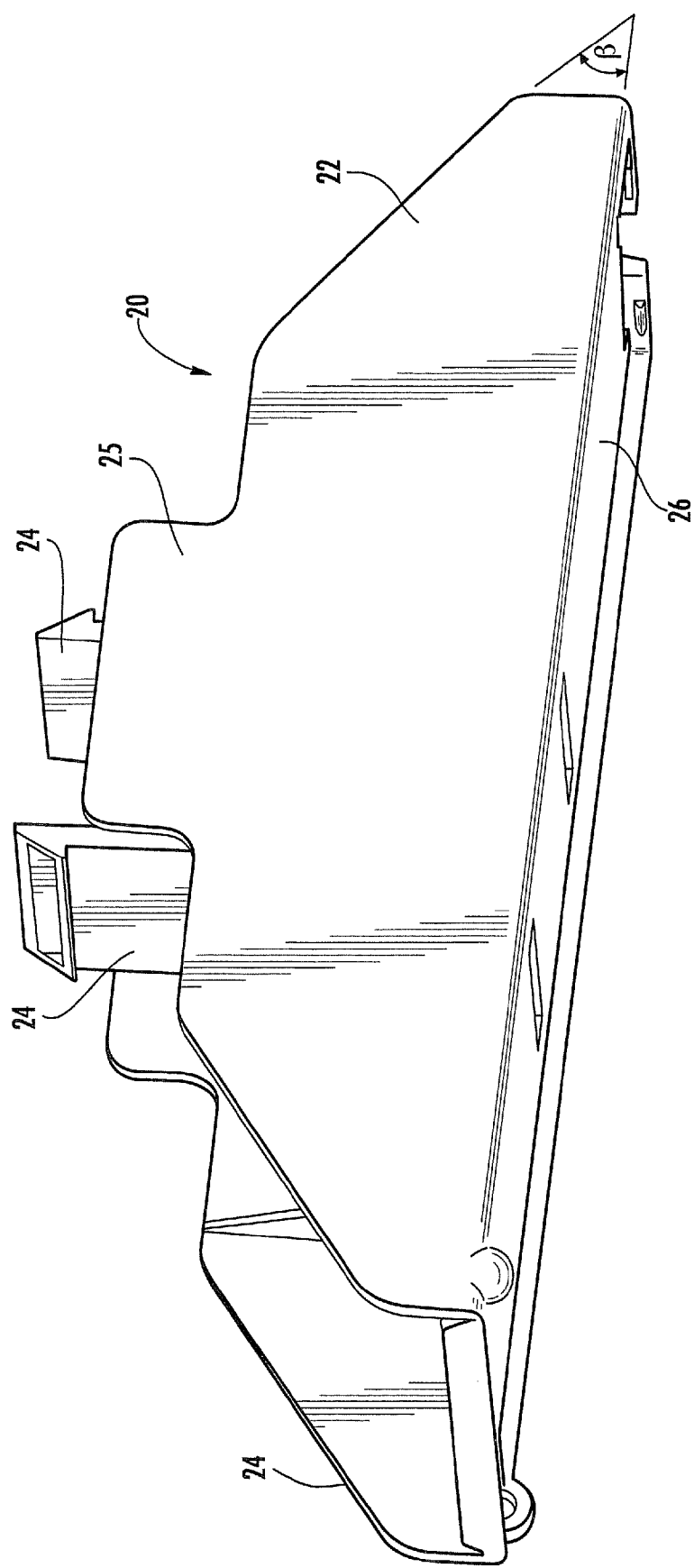
FIG. 5 is a top, rear perspective view of the display module of FIG. 2.
Figure 6:
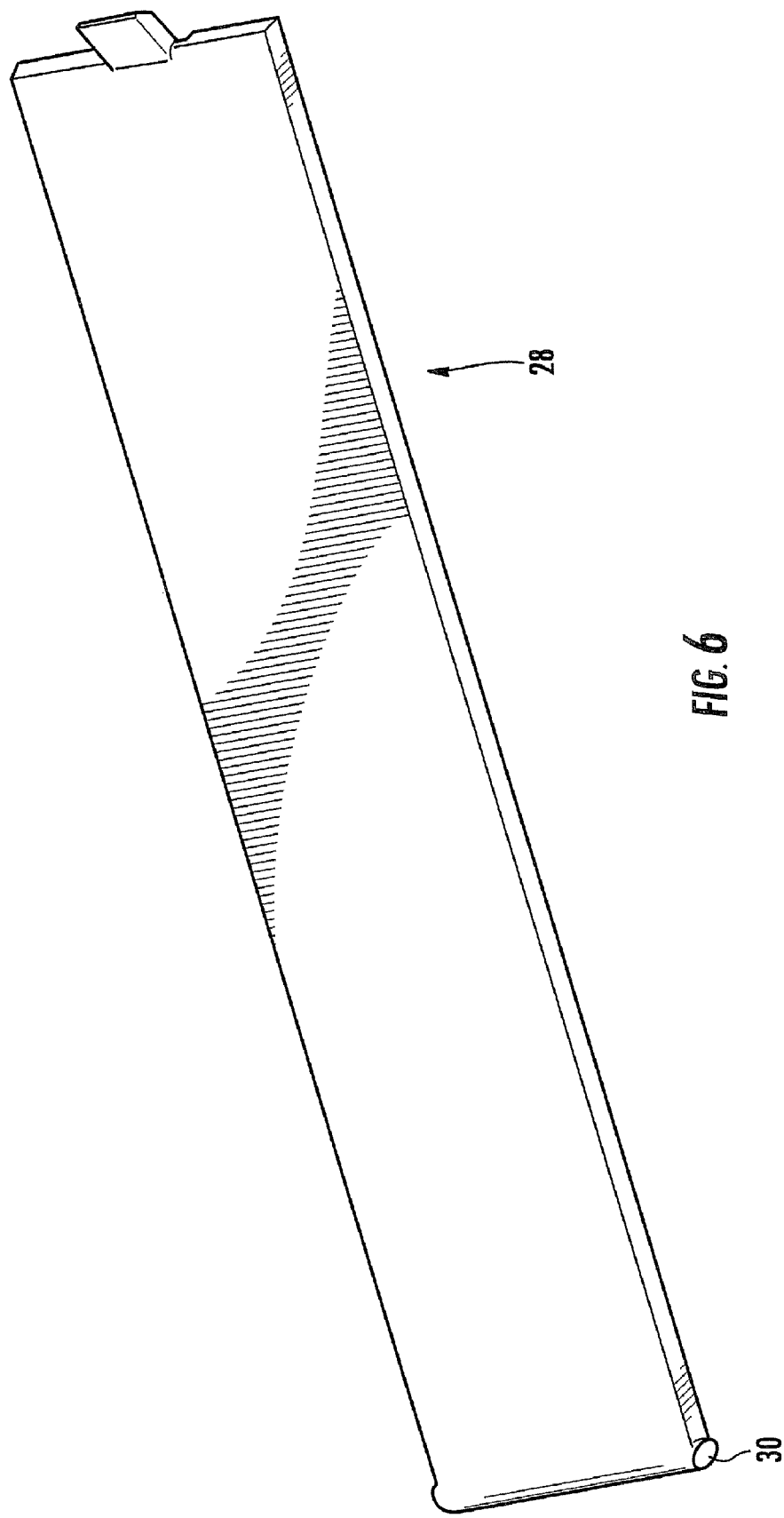
FIG. 6 is a perspective view of the cover of the display module of FIG. 2.

Turning now to FIGS. 4 and 5, the module 20 includes a generally trapezoidal body 22 having side edges 23 that taper inwardly from front to rear. Two snap latches 24 extend rearwardly from the body 22. Two generally horizontally disposed tabs 25 extend from upper and lower rear portions of the body 22. The body 22 presents a frontal display surface 26. In the illustrated embodiment, the display surface 26 underlies a cover 28 (see also FIG. 6) that is attached to the body 22 via a hinge 30, but in other embodiments the cover 28 may be hinged in a different location, may be attached in another manner (e.g., a snap latch), or may be omitted altogether. In some embodiments, the display surface 26 may be covered with paper or other sheet material on which annotations may be entered.

Returning to FIGS. 2 and 3, it can be seen that the module 20 is removably mounted to the front face 16 of the patch panel 10, and can fill the aforementioned "cone" in front of the patch panel 10. More specifically, in the illustrated embodiment the module 20 is attached through the insertion of the latches 24 into vertical slots 16a in the front face 16. In other embodiments, the latches 24 may be located to extend through slots located in different locations on the front face 16 (e.g., the slots may be horizontally disposed and located at the top and bottom regions of the front face 16). Alternatively, the slots may be located in the bezel 15 or other portion of the arm 12 rather than the front face 16, particularly if the patch panel lacks a front face and instead has a pointed frontmost portion. Moreover, the module 20 may be attached via another mounting technique, such as threaded fasteners, hook-and-loop material, adhesives, press-fit posts or pins, or the like.

As can be seen by examination of FIGS. 2-5, the module 20 provides a much increased display surface 26 for annotation than that provided by the front face 16; the display surface 26 has a width of w' (see FIG. 4), which is considerably greater than the width w of the front face 16. In some embodiments, the width w' is between about 1.5 and 5.0 times as great as w, and is typically between about 2 and 5 inches.

It can also be seen that the generally trapezoidal shape of the body 22 positions the display surface 26 forwardly of the front face 16 (and even in front of the vertex of the angle α—see FIG. 3) and enables the display surface 26 to provide additional display area, but does so without interfering with the presence, insertion or detachment of patch cords to be inserted into the connectors 16. In some embodiments, the body 22 may be configured such that the display surface 26 is between about 0.4 and 2.0 inches in front of the front face 16, and/or such that the side edges 23 of the body 22 form an angle of between about 10 and 80 degrees with the display surface 26. In some embodiments, the body 22 may take another shape; for example, the side edges 23 may be concave or convex.

The module 20 is typically formed of a polymeric material, such as polycarbonate, ABS, or a copolymer or blend thereof, but may be formed of any material recognized to be suitable for mounting to the patch panel 10 and displaying information. In some embodiments, the body 22 may be formed as a unitary member; if the body 22 is formed as a unitary member and of a polymeric material, it may be injected molded.

There may be multiple advantages to the removability of the display module 20 from the patch panel 12. As a result of the display module 20 being removable, the display module 20 may be included or omitted from the patch panel 12 as desired by the user. Also, the removability enables the user to move the display module 20 between different installed patch panels 12 if desired. A removable display module 20 also provides the user with the option of removing the display module 20 for annotation on the display surface 26, or for switching a new sheet of paper for annotation, rather than having to perform such an operation while the display module is attached to the patch panel 12. Moreover, if the display module 20 becomes damaged, it can be easily replaced, rather than required replacement of the entire patch panel 12. Other advantages may be apparent to those of skill in this art.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A patch panel assembly, comprising:
   a patch panel having a pair of arms fixed relative to each other, the arms defining an obtuse angle, each of the arms including a plurality of mounting locations for telecommunications connectors, with a vertex of the obtuse angle extending in a forward direction, the patch panel further comprising a plurality of telecommunication connectors mounted in the mounting locations; and
   a display module removably mounted to the patch panel, the display module having a body and a front-facing display surface, the display surface being positioned forwardly of the vertex of the obtuse angle.

2. The patch panel assembly defined in claim 1, wherein the display module body tapers inwardly from the display surface to the patch panel.

3. The patch panel assembly defined in claim 1, wherein the patch panel further includes a front face positioned between forward ends of the arms, and wherein the display module is mounted to the front face.

4. The patch panel assembly defined in claim 2, wherein the obtuse angle is between about 100 and 150 degrees, and wherein the angle of taper of the display module body is between about 10 and 80 degrees.

5. The patch panel assembly defined in claim 1, wherein the display module is mounted to the patch panel via a snap latch.

6. The patch panel assembly defined in claim 1, wherein the display module includes a cover that overlies the display surface.

7. The patch panel assembly defined in claim 6, wherein the cover is attached to the body via a hinge.

8. A patch panel assembly, comprising:
   a patch panel having a pair of arms fixed relative to each other via a front face, the arms defining an obtuse angle, each of the arms including a plurality of mounting locations for telecommunications connectors, with a vertex of the obtuse angle extending in a forward direction, the patch panel further comprising a plurality of telecommunication connectors mounted in the mounting locations; and
   a display module removably mounted to the front face of the patch panel, the display module having a body and a front-facing display surface, the display surface being positioned forwardly of the front face of the patch panel.

9. The patch panel assembly defined in claim 8, wherein the display surface is positioned between about 0.4 and 2.0 inches in front of the front face.

10. The patch panel assembly defined in claim 8, wherein the display module body tapers inwardly from the display surface to the patch panel.

11. The patch panel assembly defined in claim 10, wherein the obtuse angle is between about 100 and 150 degrees, and wherein the angle of taper of the display module body is between about 10 and 80 degrees.

12. The patch panel assembly defined in claim 8, wherein the display module is mounted to the front face via a snap latch.

13. The patch panel assembly defined in claim 8, wherein the display module includes a cover that overlies the display surface.

14. The patch panel assembly defined in claim 13, wherein the cover is attached to the body via a hinge.

* * * * *